United States Patent
Matsumoto

(10) Patent No.: US 8,632,248 B2
(45) Date of Patent: Jan. 21, 2014

(54) LINEAR GUIDE DEVICE

(75) Inventor: Jun Matsumoto, Maebashi (JP)

(73) Assignee: NSK Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 13/059,562

(22) PCT Filed: Feb. 3, 2011

(86) PCT No.: PCT/JP2011/000623
§ 371 (c)(1),
(2), (4) Date: Feb. 17, 2011

(87) PCT Pub. No.: WO2011/118115
PCT Pub. Date: Sep. 29, 2011

(65) Prior Publication Data
US 2013/0011086 A1    Jan. 10, 2013

(30) Foreign Application Priority Data
Mar. 26, 2010 (JP) .................... 2010-073026

(51) Int. Cl.
*F16C 29/06* (2006.01)
(52) U.S. Cl.
USPC .................... 384/15; 384/13; 384/44
(58) Field of Classification Search
USPC .............. 384/13, 15, 43–45, 49, 50
See application file for complete search history.

(56) References Cited

U.S. PATENT DOCUMENTS

| | | | | |
|---|---|---|---|---|
| 4,205,885 A | * | 6/1980 | Ernst et al. | 384/43 |
| 4,357,056 A | * | 11/1982 | Olschewski et al. | 384/43 |
| 5,464,288 A | * | 11/1995 | Tanaka | 384/15 |
| 5,634,722 A | * | 6/1997 | Yuasa et al. | 384/15 |
| 7,578,619 B2 | * | 8/2009 | Nakagawa | 384/15 |
| 2004/0228551 A1 | * | 11/2004 | Tsukada et al. | 384/45 |
| 2008/0089622 A1 | * | 4/2008 | Haub | 384/15 |
| 2008/0144980 A1 | * | 6/2008 | Keller et al. | 384/15 |
| 2009/0324153 A1 | | 12/2009 | Russ et al. | |

FOREIGN PATENT DOCUMENTS

| | | |
|---|---|---|
| JP | 6-26077 A | 2/1994 |
| JP | 2003-343558 A | 12/2003 |
| JP | 2007-211900 A | 8/2007 |
| JP | 2008-215540 A | 9/2008 |
| JP | 2009-507185 A | 2/2009 |

OTHER PUBLICATIONS

International Preliminary Report on Patentability (PCT/IB/338 & 373) dated Nov. 1, 2012 (two (2) pages).
English translation of reference C2 (PCT/ISA/237) previously filed on Mar. 29, 2011 (three (3) pages).

(Continued)

*Primary Examiner* — Richard W Ridley
*Assistant Examiner* — William Santosa
(74) *Attorney, Agent, or Firm* — Crowell & Moring LLP

(57) ABSTRACT

A seal member is a member including a lip, a seal base, a first extension section smaller in thickness than the seal base, and a first locking section, all of which are formed to be continuous in the cross-sectional direction. A retainer plate includes a base accommodating concave section for accommodating the seal base, and a first engagement concave section for accommodating the first locking section, and controls the first locking section to prevent the seal member from falling off. The first locking section is accommodated in the first engagement concave section with gaps left in the thickness and cross-sectional directions.

7 Claims, 13 Drawing Sheets

(56) References Cited

OTHER PUBLICATIONS

International Search Report dated Mar. 1, 2011 including partial English-language translation (Three (3) pages).

PCT/ISA/237 dated Mar. 1, 2011 (Three (3) pages).
International Search Report dated Mar. 1, 2011 including English-language translation (Four (4) pages).

\* cited by examiner (FRONT SIDE)

(REAR SIDE)

FIG. 26A
FIG. 26B
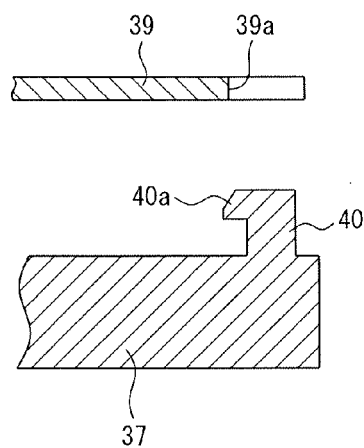
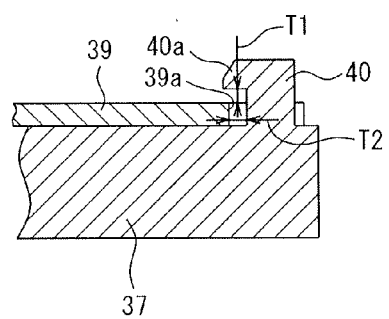

LINEAR GUIDE DEVICE

TECHNICAL FIELD

The present invention relates to a linear guide device, which is arranged in a guide unit of a machine tool, a manufacturing device, an injection molding machine etc. for linearly moving a movable carriage, such as a table.

BACKGROUND ART

The linear guide device includes a guide rail having a rolling element guide face formed on the rail side surface, a slider, which is mounted on a straddling the guide rail and moves relatively thereon, and a side seal, which is attached to the end surface in a moving direction of the slider to slide on the outer surface of the guide rail including the rolling element guide face and thereby removing foreign substances such as foreign particles, dusts, scraps etc. deposited on the outer surface of the rail.

The structures of the conventional side seals disclosed in Patent Documents 1 and 2 are well known.

The side seal of Patent Document 1 (which is referred to as end seal in Patent Document 1) has a configuration comprising a scraper section arranged opposite to the outer surface of the rail via a gap therebetween and between the scraper section and the end surface in the moving direction of the slider, a case section, which is arranged opposite to the outer surface of the rail via a gap, and a seal member in which a lip extending from a seal base has contact with the outer surface of the rail, wherein the seal base is sandwiched and held between the case section and the scraper section.

The side seal of Patent Document 2 has a configuration comprising an end cap secured to the end surface in the moving direction of the slider, a concave groove formed along the inner surface of the end cap opposite to the outer surface of the rail of the guide rail, and a seal member in which a lip extending from a seal base has contact with the outer surface of the rail, wherein the seal base is engaged with the concave groove.

PRIOR ART DOCUMENTS

Patent Documents

Patent Document 1: JP 2007-211900A
Patent Document 2: JP 2003-343558A

SUMMARY OF THE INVENTION

Problems to be Solved by the Invention

Meanwhile, according to the side seal of Patent Document 1, a convex portion formed in the seal base is engaged with a concave section formed in the case section so as to align in the thickness direction and the cross-sectional direction of the seal member (i.e., orthogonal direction to the thickness direction). However, since the side seal of Patent Document 1 has a structure that the concave section of the case section is engaged with the convex portion of the seal section without backlash, manufacturing errors of the case section and the seal member may generate a gap between the lip of the seal member and the outer surface of the guide rail, leading to deterioration in dust resistance or generation of an excessively strong contact force between the outer surface of the guide rail and the lip. This may cause rise in friction and decrease in wear resistance.

Moreover, the seal member, the case section, and the scraper section of the side seal according to Patent Document 1 are not structured to be integrated into a single body. Therefore, workability for attaching the side seal is poor because they are separated until they are secured by screws in the moving direction end face of the slider.

Furthermore, according to the side seal of Patent Document 2, only the seal outer circumference of the side seal is attached to the concave groove formed in the end cap. Therefore, when a big vibration is applied thereto, the seal base may slide out of the concave groove and the seal member may fall off.

The present invention has been made in view of the conventional unsolved problems described above, and has an object to provide a linear guide device which prevents deterioration of dust resistance and wear resistance of the seal member and prevents the seal member from falling off.

Solution to the Problem

In order to attain the above-described objective, a linear guide device according to an aspect of the present invention includes: a guide rail, a slider mounted straddling the guide rail and moving relatively on the guide rail, and a side seal attached to an end face of the slider in a moving direction of the slider; wherein the side seal comprises a retainer plate having contact with the end face, a cover member overlapped with the retainer plate in a thickness direction of the retainer plate, and a seal member arranged between the retainer plate and the cover member, the seal member is a member comprising a lip having contact with a guide face of the guide rail, a seal base, a first extension section smaller in thickness than the seal base, and a first locking section greater in thickness than the first extension section, which are all formed to be continuous from the guide face in a cross-sectional direction apart from the guide face, the retainer plate comprises a base accommodating concave section that comprises a thickness directional alignment section and a cross-sectional direction alignment section and accommodates the seal base, and a first engagement concave section for accommodating the first locking section and controls a movement of the first locking section in the cross-sectional direction, and when the lip slides on the guide face of the guide rail and the slider moves, the seal base comes into contact with the thickness directional alignment section and the cross-sectional direction alignment section of the base accommodating concave section and controls the movement in thickness and the cross-sectional directions, and the first locking section is accommodated in the first engagement concave section with gaps left in the thickness and the cross-sectional directions, respectively.

Moreover, according to the linear guide device according to another aspect of the present invention, a thickness-directional part of the seal base may have contact with the thickness-directional alignment section of the base accommodating concave section and the cover member, and having a relationship of T1>T2 where T1 denotes the thickness of the seal base and T2 denotes the depth of the base accommodating concave section to the thickness-directional alignment section. Moreover, in the linear guide device according to another aspect of the present invention, the cross-sectional direction alignment section of the base accommodating concave section may be a projection protruding toward the guide face.

Moreover, in the linear guide device according to another aspect of the present invention, the seal member may comprise a second extension section smaller in thickness than the first locking section and a second locking section greater in thickness than the second extension section, both of which are formed orthogonal to the thickness direction apart from the guide face, the retainer plate may accommodate the second locking section and may comprise a second engagement concave section for controlling the movement of the second locking section to the guide face in the cross-sectional direction, and when the lip slides on the guide face of the guide rail and the slider then moves, the second locking section may be accommodated in the second locking section with gaps left in the thickness and cross-sectional directions.

Moreover, in the linear guide device according to another aspect of the present invention, the seal member and the retainer plate may be respectively controlled in the thickness-directional movement and integrated into a single body attachable and detachable.

Furthermore, in the linear guide device according to another aspect of the present invention, in the seal member and the cover member may be respectively controlled in the thickness-directional movement and integrated into a single body attachable and detachable.

Yet furthermore, in the linear guide device according to another aspect of the present invention, the retainer plate and the cover member may be respectively controlled in the thickness-directional movement and integrated into a single body attachable and detachable.

Advantageous Effect of the Invention

According to the linear guide device of the present invention, when the lip of the seal member slides on the guide face of the guide rail and the slider then moves, the seal base of the seal member comes in contact with the thickness directional alignment section and the cross-sectional direction alignment section of the base accommodating concave section of the retainer plate, and movement thereof along the thickness and the cross-section is controlled. As a result, deformation of the lip and decrease in dust resistance can be surely prevented.

Moreover, the first locking section of the seal member is accommodated in the first engagement concave section of the retainer plate, with gaps left along the thickness and the cross-section thereof. Therefore, even if an external force to extract the seal member is applied, engagement of the first locking section with the first engagement concave section prevents the seal member from falling off.

BRIEF DESCRIPTION OF DRAWINGS

FIGS. 26A and 26B are cross-sectional views illustrating an engagement state of the retainer plate and the cover member of FIG. 24.

DESCRIPTION OF EMBODIMENTS

An aspect of the present invention (hereafter referred to as an embodiment) will now be described in detail with reference to the drawings.

Figure 1:
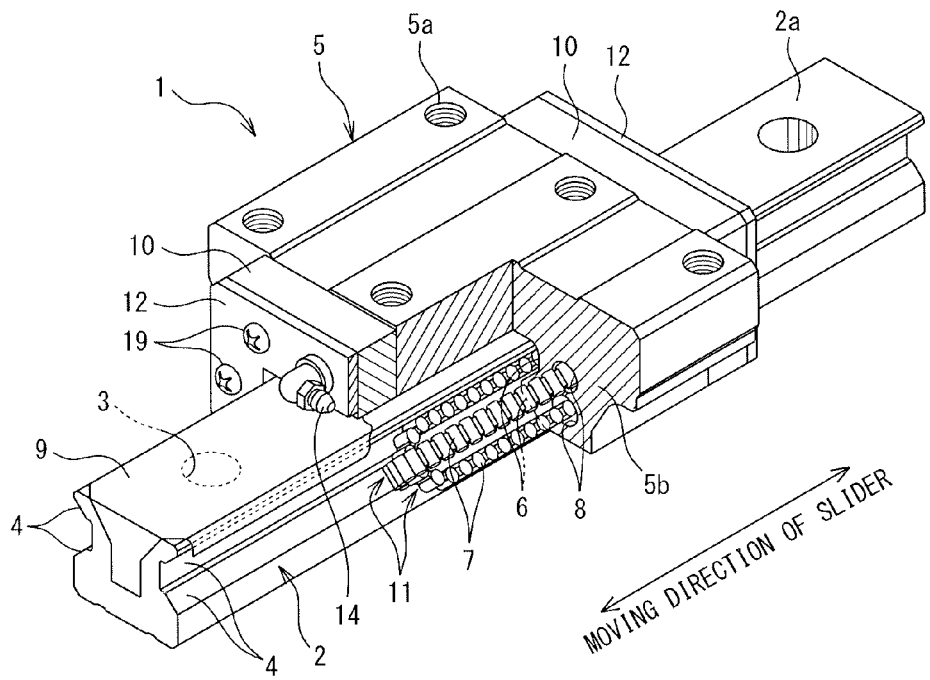
FIG. 1 is a perspective view illustrative of linear guide device according to the present invention.

A linear guide device 1 shown in FIG. 1 is a device comprising a guide rail 2, a slider 5, end caps 10, and side seals 12.

The guide rail 2 is a long rod-like member made of a steel material, such as an alloy steel. Rail installation holes 3 that are step bolt holes used to secure the guide rail 2 to a pedestal or the like of a mechanical device are formed in the rail upper surface 2a in predetermined intervals. A pair of approximately V-shaped rail track surfaces 4 is formed on the side surface of the guide rail 2 along the length of the guide rail 2.

Figure 2:
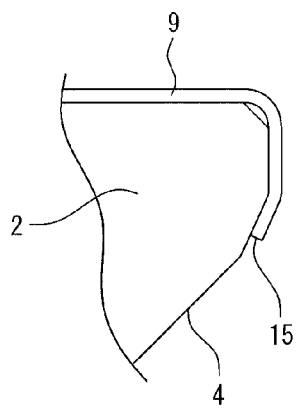
FIG. 2 is an illustration of the form of a rail cover arranged on the upper surface of a guide rail.

A rail cover 9 of a thin plate made of an alloy steel or the like is arranged on the rail top surface 2a. As shown in FIG. 2, a widthwise edge of the rail cover 9 extends up to the side surface of the guide rail 2, and a step 15 is formed between the widthwise edge and the surface of the guide rail near the rail track surface 4. The slider 5 is a saddle-shaped member made of a steel material, such as an alloy steel, having a cross-section approximately U-shaped, wherein an attaching screw hole 5a is formed in the top surface, and a movable carriage and the like of the mechanical device are fastened by a bolt with this attaching screw hole 5a.

Slider raceway faces 6, which are a pair of slopes opposite to the rail track surfaces 4, are formed inside both side walls 5b of the slider 5. On the thicker part thereof, return passages 8, each of which is a through-hole having an approximately rectangular cross-section for circulating rollers 7 and passing the slider 5 through in the moving direction of the slider 5, are formed along each slider raceway surface 6. Each roller 7 has a cylindrical shape and is made of a steel material, such as an alloy steel.

The end caps 10 are each made of a metallic material, a resin material etc., and has a saddle-like shape having approximately the same U-shaped cross-sectional shape as that of the slider 5, and is arranged in the front and back ends in the moving direction of the slider 5. Direction changing paths 11 are formed in the respective end caps 10 and are each of which is a curved passage having an approximately rectangular cross-section for connecting a load passage to be described later and the return passage 8, respectively. They are formed in a so-called tucking up sleeves of a kimono with a cord form to avoid mutual crossing and to have a function of guiding the rollers 7 and changing the circulation direction thereof.

The load passage through which the rollers 7 roll forward is formed by the rail track surfaces 4 of the guide rail 2 and the slider raceway faces 6 of the slider 5. Both ends are respectively connected by the direction changing paths 11 of the end caps 10 and the return passages 8 of the slider 5, and the movement of the slider 5 forms circulating paths through which the rollers 7 circulate. The rollers 7 rolling through the load passage support the load applied to the slider 5 for reciprocation, so that the slider 5 is supported to be capable of reciprocating in a straight line along the length of the guide rail 2.

The side seals 12 are arranged on the end faces of the outside of the end caps 10, respectively, and are attached to the slider 5 via the end caps 10 by screw members 19.

A grease nipple 14, which is connected to a lubricant supply groove (not shown in the drawing), is attached to the end faces of the end caps 10 on the slider 5 side, and this grease nipple 14 is used when replenishing the direction changing paths 11 of the end cap 10 with grease as a lubricant.

First Embodiment

Structure of Side Seal

Figure 3:
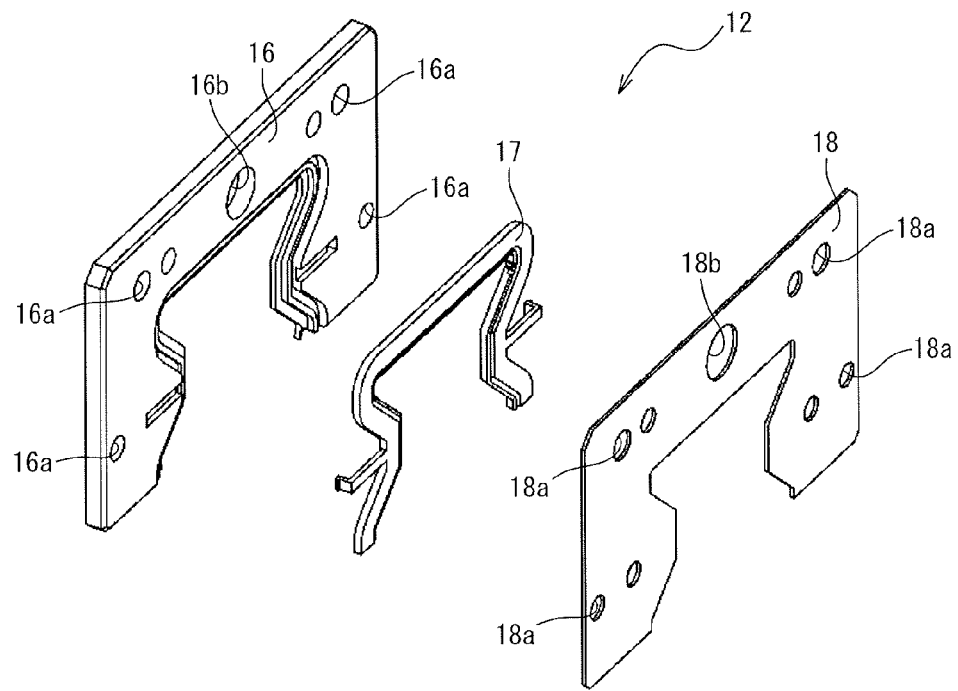
FIG. 3 is an illustration of included members of the linear guide device.
Figure 4:
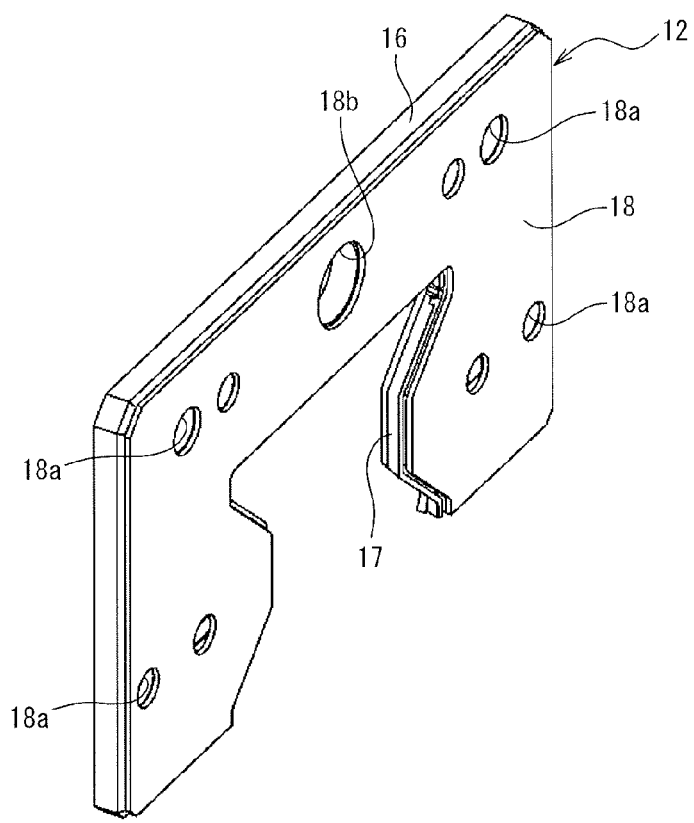
FIG. 4 is an illustration of an integrated side seal.

A side seal 12 includes a retainer plate 16, a seal member 17, and a cover member 18 as shown in FIG. 3. These members are attached by overlapping the retainer plate 16 and the cover member 18 via the seal member 17 sandwiched therebetween (see FIG. 4). The retainer plate 16 is brought into contact with the end face of the outside of an end cap 10, and then screwing screw members 19, which have been respectively pushed through tapped holes 16a of the retainer plate 16 and tapped holes 18a of the cover member 18 aligned with each other (see FIG. 1), into the end face of the end cap 10. Note that a region 16b of the retainer plate 16 and a region 18b of the cover member 18 in FIG. 3 are respective nipple insertion holes through which the grease nipple 14 is inserted.

Figure 5:
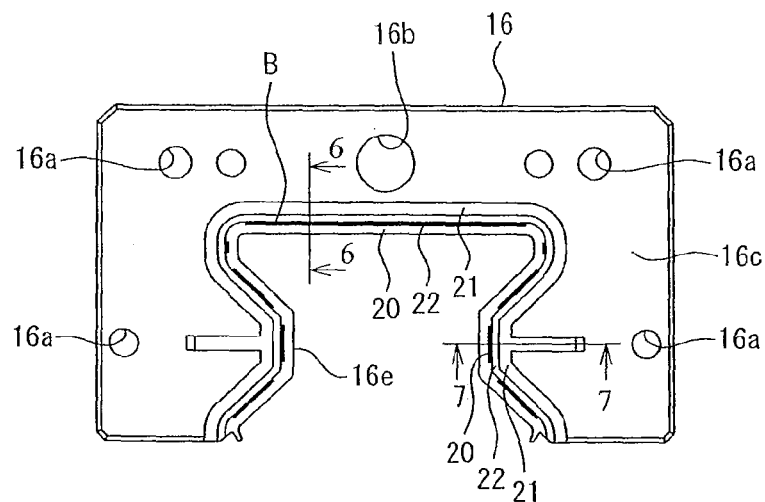
FIG. 5 is an illustration of a retainer plate included in the side seal.
Figure 6:
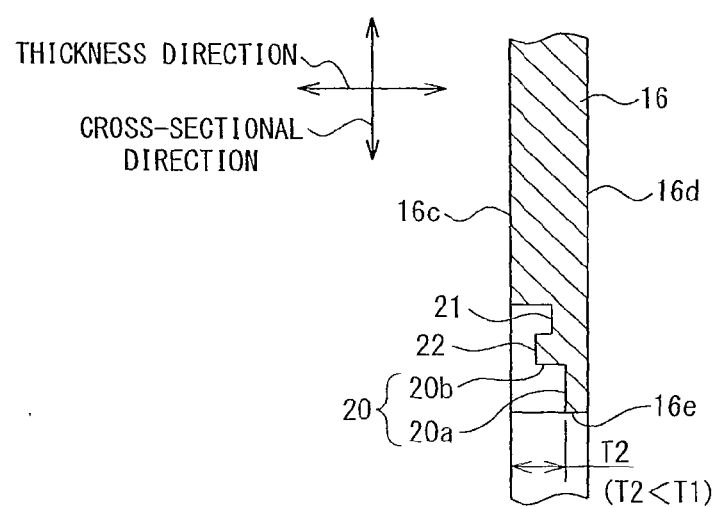
FIG. 6 is a view cut along line 6-6 of FIG. 5.
Figure 7:
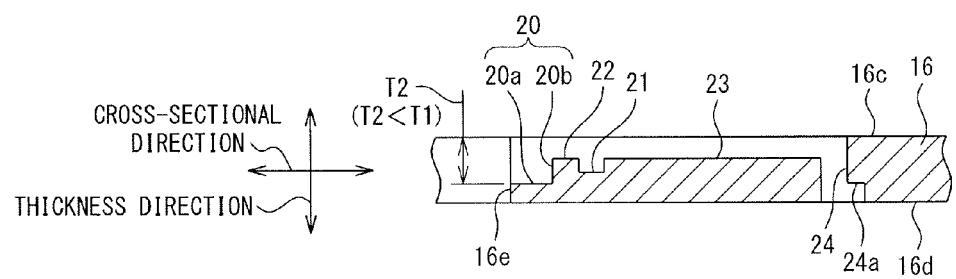
FIG. 7 is a view cut along line 7-7 of FIG. 5.

A structure of the retainer plate 16 is described while referencing FIGS. 5 to 7.

As shown in FIG. 5, the retainer plate 16 is a saddle-like member having an approximately U-shape similar to that of the slider 5, and is made from an injection-molded product of hard synthetic resin, such as polyacetal resin, 66-nylon resin, and a metallic material, such as aluminum or steel.

An inner periphery 16e of the retainer plate 16 is formed in a form facing the top surface 2a of the guide rail 2 and one side surface of the same (a pair of rail track surfaces 4), and an engaging groove 21 and a belt-like base accommodating section 20 holding the seal member 17 are formed along the inner periphery 16e on a surface 16c having contact with the cover member 18. Note that the other side surface of the retainer plate 16 has contact with the end face of the outside of the end cap 10.

That is, as shown in FIG. 6 (a view cut along line 6-6 of FIG. 5), the base accommodating section 20 is constituted by a thickness-directional alignment face 20a, which is in parallel detached from the surface 16c, extending in the thickness direction thereof, and a cross-sectional direction alignment face 20b, which extends in the cross-sectional direction thereof orthogonal to the thickness direction, wherein the surface 16c has contact with the cover member 18, and both the alignment faces 20a and 20b are formed by cutting the inner periphery 16e. Making contact of the seal base 25 of the seal member 17 to be described later with the thickness-directional alignment face 20a and the cross-sectional direction alignment face 20b determines a protruding quantity of the lip 26 of the seal member 17 to the top surface 2a of the guide rail 2 and the pair of rail track surfaces 4.

In this case, the depth from the surface 16c of the retainer plate 16 to the thickness-directional alignment face 20a is set to T2.

A land 22 is formed continuous from the cross-sectional direction alignment face 20b, projecting to the surface 16c from the thickness-directional alignment face 20a.

An engaging groove 21 is established in a position detached from the inner periphery 16e relative to the base accommodating section 20, and is formed as a deeper concave shaped groove than the land 22.

As shown in FIG. 7 (a view cut along line 7-7 of FIG. 5), the retainer plate 16 includes an extension groove 23, which extends to be continuous from a part of the engaging groove 21 in the cross-sectional direction thereof and is detached from the inner periphery 16e, and an engagement hole 24, which is formed continuously at the end of the extension groove 23 and passes through the other surface 16d of the retainer plate 16. An engagement step 24a is formed in the open edge on the other surface 16d of the engagement hole 24.

In this case, the base accommodating section 20 including the thickness-directional alignment face 20a and the cross-sectional direction alignment face 20b described above is formed in a position indicated by a reference letter B and a thick line in FIG. 5 while the base accommodating section 20 not indicated by the reference letter B and a thick line has only the thickness-directional alignment face 20a having contact with the seal base 25 of the seal member 17.

Next, a structure of the seal member 17 will be described with reference to FIGS. 8 to 12.

Figure 8A:
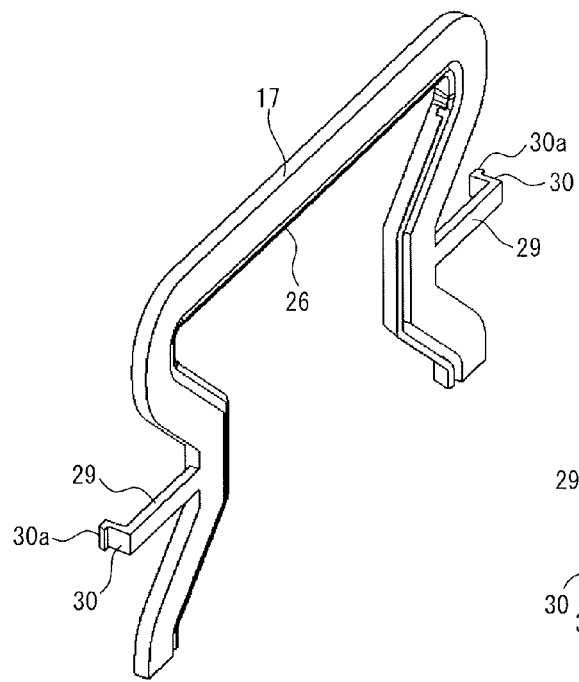
FIGS. 8A and 8B are illustrations of a seal member comprising the side seal.
Figure 8B:
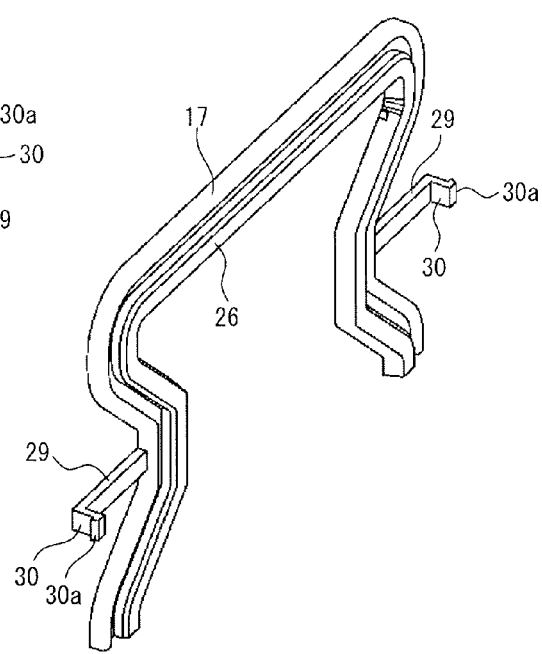

The seal member 17, as shown in FIGS. 8A and 8B, is an approximately U-shaped belt-like member, and the inner periphery contour thereof has a form shrunk by a shrink range to be described later, relative to the contours of the rail top surface 2a of the guide rail 2 and the pair of rail track surfaces 4. This seal member 17 is made of highly flexible synthetic resin or an injection-molded rubber product, more specifically, a member such as polyester-series elastomer resin, urethane elastomer resin, nitrile rubber resin, or fluoride gum resin. Specific product names of the polyester series elastomer resin are EN1000, EN2000, EN3000, EN5000 etc. made by TOYOBO Co., Ltd.

Figure 9:
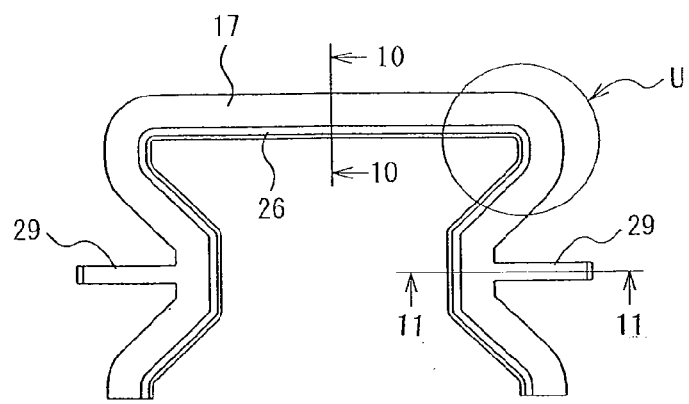
FIG. 9 is a front view of the seal member.
Figure 10:
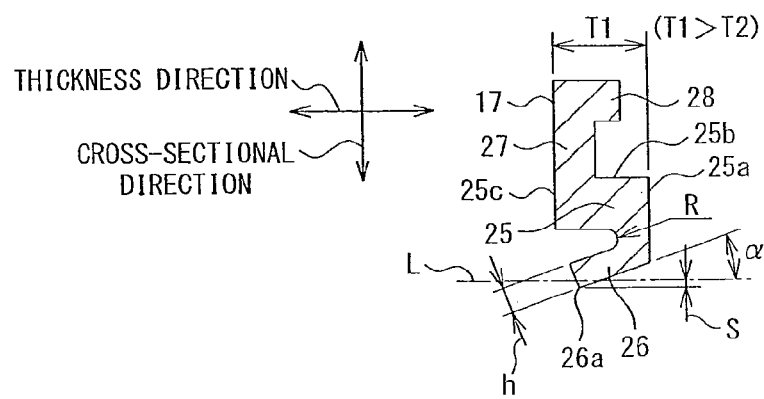
FIG. 10 is a view cut along line 10-10 of FIG. 9.

As shown in FIG. 10 (a view cut along line 10-10 of FIG. 9), the seal member 17 includes a seal base 25, a lip 26, which has contact with the pair of rail track surfaces 4 and the rail top surface 2a of the guide rail 2 continuous from the seal base 25 in the widthwise direction thereof, and a first locking section 28 formed to be continuous from the seal base 25 via the first extension section 27 in the opposite width direction to the lip 26.

A line indicated by a reference letter L in FIG. 10 is an imaginary line indicative of the position of the rail top surface 2a and the pair of rail track surfaces 4, and the lip 26 is elastically deformed upward in FIG. 10. If the thickness of the lip 26 is too thin, the strength of the lip falls short. Otherwise if the thickness of the lip 26 is too thick, flexibility falls short. Therefore, the lip in this embodiment has a thickness of h=0.5 mm.

Moreover, in this embodiment, in order to prevent breakage of the root of the lip 26, a corner R is formed in the lip root and is set to 0.2 mm. Furthermore, in this embodiment, a tilt angle α of the lip 26 is set to 20 degrees.

Yet furthermore, a protruding quantity S at the tip end of the lip 26 from the imaginary line L corresponds to the shrink range described above, wherein this shrink range is set so that no gap is developed between the rail top surface 2a and the pair of rail track surfaces 4 even if there is a manufacturing error. In this embodiment, the protruding quantity S is set to 0.15 mm.

A tip end 26a of the lip 26 has rounded corners in order to stabilize contact with the rail top surface 2a and the pair of rail track surfaces 4. The radius of each rounded corner is set to 0.05 mm to 0.2 mm, for example. Moreover, when a parting line of an injection mold comes to the lip tip during injection molding of the seal member 17, burr tends to easily occur at the tip end 26a. Therefore, in this embodiment, the parting line of the injection mold is arranged avoiding the tip end 26a.

Note that, the above-described numerical values are mere design items, and those values may be chosen comprehensively in consideration of strength, flexibility, wear resistance, a manufacturing error, etc. of the seal member 17.

As shown in FIG. 10, the seal base 25 of the seal member includes a thickness-directional position alignment section 25a, which has contact with the thickness-directional alignment face 20a formed in the base accommodating section 20 of the retainer plate 16, a cross-sectional direction position alignment section 25b, which has contact with the cross-sectional direction alignment face 20b, and a cover member abutment part 25c, which abuts the cover member 18.

Dimension T1 between the cover member abutment part 25c and the thickness-directional position alignment section 25a of the seal base 25 (i.e., thickness of the seal base 25) is set to a greater value than the depth T2 of the thickness-directional alignment face 20a of the retainer plate 16 described above (i.e., T1>T2). Note that T1=1.7 mm and T2=1.65 mm in this embodiment.

A first extension portion 27 of the seal member 17 extends along the land 22 of the retainer plate 16 shown in FIG. 6, and the first locking part 28 of the seal member 17 enters the engaging groove 21 of the retainer plate 16.

Moreover, as shown in FIG. 9, a second extension section 29 protruding outward from an approximately U-shaped portion is formed in the seal member 17.

Figure 11:
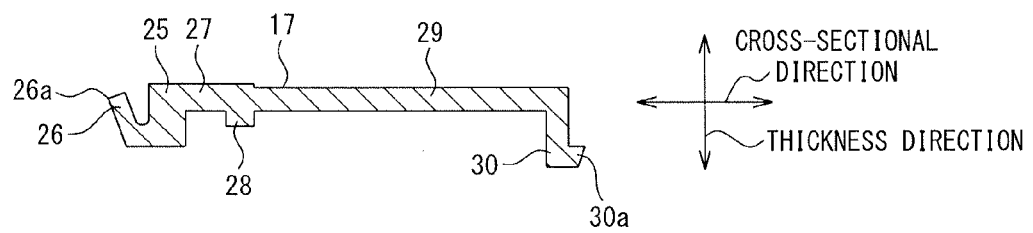
FIG. 11 is a view cut along line 11-11 of FIG. 9.

That is, as shown in FIG. 11 (a view cut along line 11-11 in FIG. 9), the second extension section 29 continuous from a part of the first locking part 28 of the seal member 17 is formed to be detached from the lip 26 in the cross-sectional direction, and a second locking part 30 is formed at the end of the second extension section 29. A pawl part 30a is formed at the end of this second locking section 30.

The second extension section 29 extends along the extension groove 23 of the retainer plate 16 shown in FIG. 7, the second locking section 30 enters the engagement hole 24 of the retainer plate 16, and the pawl part 30a formed in the end of the second locking section 30 engages with the end of the engagement step 24a formed in the open edge on the other surface 16d side of the engagement hole 24.

Figure 12:
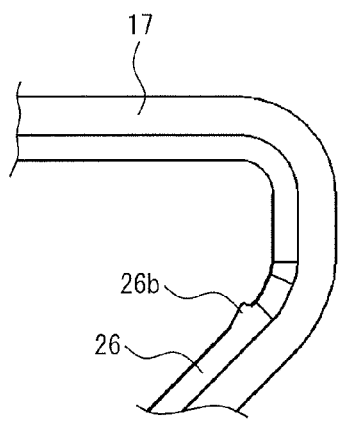
FIG. 12 is an enlarged view of the region indicated by a reference letter U in FIG. 9.

Moreover, as shown in FIG. 12 or an enlarged view of the region shown by a circle indicated by a reference letter U in FIG. 9, a lip protrusion 26b protruding inward is formed in a part of the lip 26 of the seal member 17. This lip protrusion 26b corresponds to the step 15 formed in the widthwise edge of the rail cover 9 established in the rail top surface 2a described above.

Next, the side seal 12, which has the retainer plate 16 and the cover member 18 stacked via the seal member 17 and is arranged on the end face of the outside of the end cap 10, is described with reference to FIGS. 13 to 16. Note that no screw member 19 for securing the guide rail 2 and the side seal 12 to the end cap 10 and no grease nipple 14 is illustrated in FIG. 13.

Figure 13:
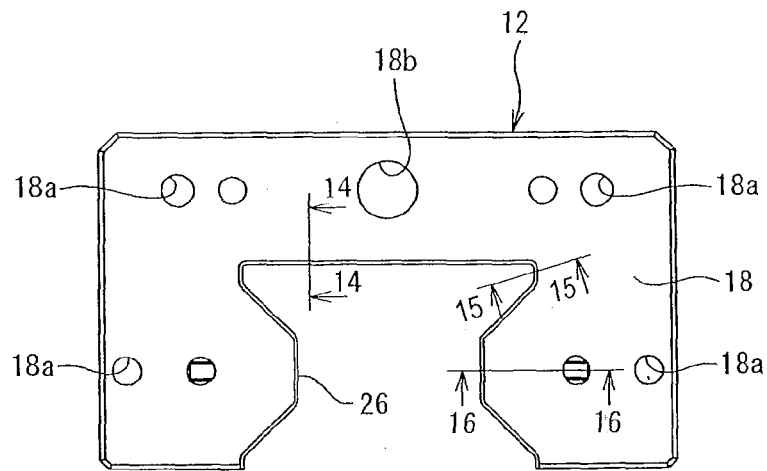
FIG. 13 is a view illustrative of an integrated structure made from the retainer plate, the seal member, and a cover member.

A portion indicated by line 14-14 in FIG. 13 corresponds to the portion indicated by the reference letter B and a thick line (where the base accommodating section 20 including the thickness-directional alignment face 20a and the cross-sectional direction alignment face 20b is formed) in FIG. 5, which describes the retainer plate 16.

Figure 14:
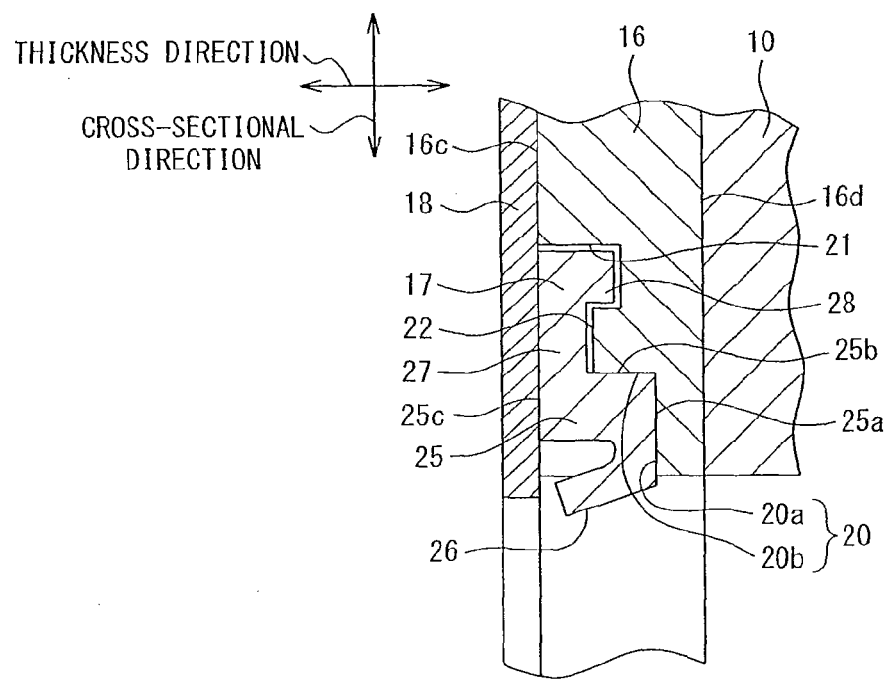
FIG. 14 is a view cut along line 14-14 of FIG. 13.

In the base accommodating section 20 including this thickness-directional alignment face 20a and cross-sectional direction alignment face 20b, as shown in FIG. 14 (a view cut along the line 14-14 of FIG. 13), the seal base 25 of the seal member 17 where the thickness T1 is greater than the depth T2 of the thickness-directional alignment face 20a of the retainer plate 16 is compressed by securing the cover member 18 to the one surface 16c of the retainer plate 16, and thus the thickness-directional position alignment section 25a comes into contact with the thickness-directional alignment face 20a. Moreover, the lip 26 of the seal member 17 comes into contact with the rail top surface 2a of the guide rail 2, and the seal base 25 is then pressed down in the upper cross-sectional direction of FIG. 14. Consequently, the cross-sectional direction position alignment section 25b comes into contact with the cross-sectional direction alignment face 20b.

Moreover, the first extension section 27 of the seal member 17 extends along the land 22 of the retainer plate 16, and the first locking section 28 enters the engaging groove 21 of the retainer plate 16, with a gap left therebetween.

A portion indicated by line 15-15 in FIG. 13 corresponds to the portion not indicated by the reference letter B and a thick line (where the base accommodating section 20 including only the thickness directional alignment face 20a is formed) in FIG. 5, which describes the retainer plate 16.

Figure 15:
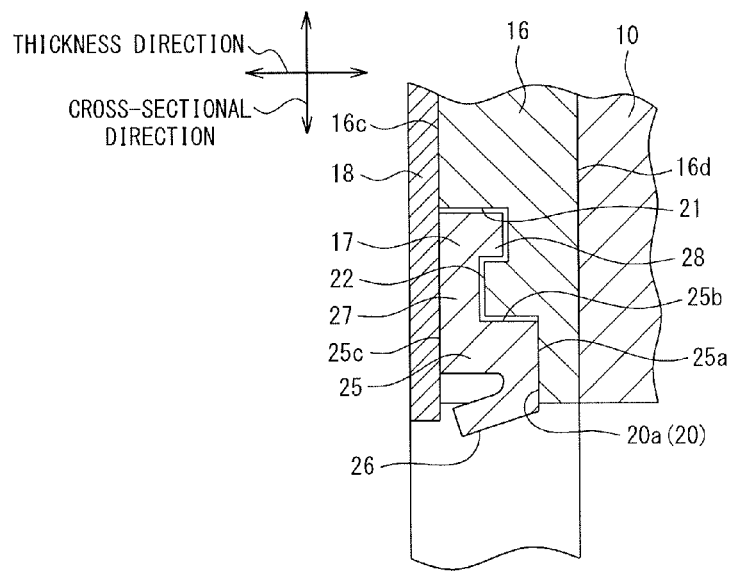
FIG. 15 is a view cut along line 15-15 of FIG. 13.

In the base accommodating section 20 including the base accommodating section 20 equipped only with this thickness-directional alignment face 20a, as shown in FIG. 15 (a view cut along the line 15-15 of FIG. 13), the thickness-directional position alignment section 25a has contact with the thickness directional alignment face 20a, but the cross-sectional direction position alignment section 25b does not come into contact with the cross-sectional direction alignment face 20b, thereby generating a gap therebetween. The first extension section 27 of the seal member 17 extends along the land 22 of the retainer plate 16, and the first locking section 28 enters the engaging groove 21 of the retainer plate 16, with a gap left therebetween.

Meanwhile, a portion indicated by line 16-16 in FIG. 13 corresponds to the portion indicated by the reference letter B and a thick line (where the base accommodating section 20 including the thickness-directional alignment face 20a and the cross-sectional direction alignment face 20b is formed) in FIG. 5, which describes the retainer plate 16.

Figure 16:
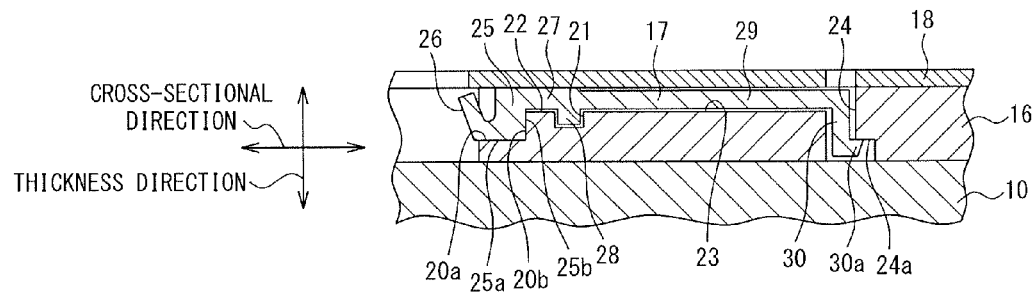
FIG. 16 is a view cut along line 16-16 of FIG. 13.

In the base accommodating section 20 equipped with this thickness-directional alignment face 20a and cross-sectional direction alignment face 20b, as shown in FIG. 16 a view cut along the line 16-16 of FIG. 13), the seal base 25 of the seal member 17 is compressed, and the thickness-directional position alignment section 25a comes into contact with the thickness-directional alignment face 20a. Moreover, the lip 26 of the seal member 17 comes into contact with the pair of rail track surfaces 4 of the guide rail 2, and the seal base 25 is pressed down in the right cross-sectional direction of FIG. 16, causing the cross-sectional direction position alignment section 25b to come into contact with the cross-sectional direction alignment face 20b.

The first extension section 27 of the seal member 17 extends along the land 22 of the retainer plate 16, and the first locking section 28 enters the engaging groove 21 of the retainer plate 16, with a gap left therebetween.

Furthermore, the second extension section 29 continuous from the first locking section 28 extends along the extension groove 23, and the second locking section 30 enters the engagement hole 24 of the retainer plate 16. The pawl part 30a formed at the tip end of the second locking section 30 then engages with the engagement stepped section 24a formed in the open edge on the other surface 16d side of the engagement hole 24.

In this case, the guide face of the present invention corresponds to the rail top surface 2a and the rail track surfaces 4, the base accommodating concave section of the present invention corresponds to the base accommodating section 20, the thickness-directional alignment section of the present invention corresponds to the thickness-directional alignment face 20a, the cross-sectional direction alignment section of the present invention corresponds to the cross-sectional direction alignment face 20b, the first engagement concave section of the present invention corresponds to the engaging groove 21, and the second engagement concave section of the present invention corresponds to the engagement hole 24.

Next, functions and results of the embodiments will be described.

Figure 17:
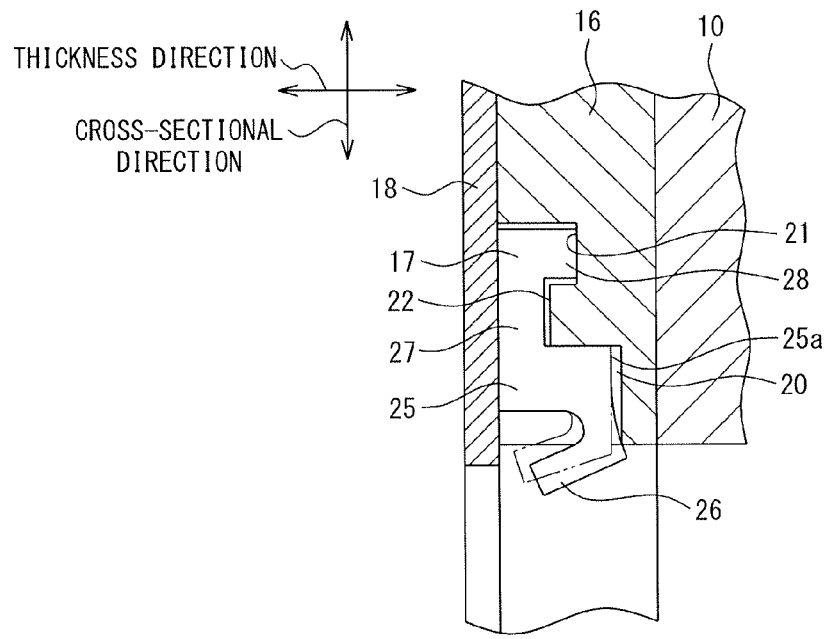
FIG. 17 is an illustration of a comparative example not comprising the present invention.

FIG. 17 is an illustration of a comparative example to this embodiment. In this comparative example, the base accommodating section 20 of the retainer plate 16 does not have a thickness-directional alignment face, which has contact with the thickness-directional position alignment section 25a of the seal base 25 of the seal member 17, but has a clearance. Moreover, it has a structure in which the first locking section 28 of the seal member 17 has contact with the engaging groove 21 of the retainer plate 16 in the thickness direction.

When the side seal with such a structure moves along with the slider 5, the lip 26 of the seal member 17 on which a thickness-directional external force is exerted may be deformed to a position indicated by a solid line, causing degradation of dust resistance or breakage of the root of the lip 26.

On the other hand, in the side seal 12 of this embodiment, as shown in FIGS. 14 to 16, the seal base 25 in which the seal member 17 is compressed and deformed, has contact with the thickness-directional alignment face 20a of the base accommodating section 20 of the retainer plate 16, and the side seal 12 moves along with the slider 5, exerting a thickness-directional external force. However, the thickness-directional alignment face 20a stops such an external force, surely preventing deformation of the lip 26. As a result, the dust resistance does not decrease, and may prevent breakage of the root of the lip 26 or the like.

Moreover, when the lip 26 comes into contact with the rail top surface 2a of the guide rail 2 and the pair of rail track surfaces 4, and the seal base 25 is pressed down in the direction of detaching from the guide rail 2, the cross-sectional direction position alignment section 25b of the seal base 25 of the seal member 17 comes into contact with the cross-sectional direction alignment face 20b intermittently arranged in the extending direction of the base accommodating section 20 of the retainer plate 16, as shown in FIGS. 14 to 16. Therefore, the rail top surface 2a of the guide rail 2 and the pair of rail track surfaces 4 can be arranged at secured intervals from the lip 26.

Furthermore, as shown in FIGS. 14 to 16, the first locking section 28 of the seal member 17 has entered the engaging groove 21 of the retainer plate 16, and the second locking section 30 of the seal member 17 has also entered the engagement hole 24 of the retainer plate 16. Therefore, even if an external force to extract the seal member 17 from between the cover member 18 and the retainer plates 16 is applied, engagement of the first locking section 28 with the engaging groove 21 and engagement of the second locking section 30 with the engagement hole 24 prevents the seal member 17 from falling off.

Since the pawl part 30a of the seal member 17 is engaged with the engagement step 24a of the retainer plate 16, the seal member 17 and the retainer plate 16 are integrated into a single body. This allows easy operation for attaching the side seal 12 to the end face of the end cap 10.

In addition, as shown in FIG. 12, when the side seal 12 moves along with the slider 5, since the lip protrusion 26b formed in a part of the lip 26 of the seal member 17 has a structure of making contact with the step 15 of the widthwise edge of the rail cover 9 established in the rail top surface 2a, protection of the step 15 against dust is ensured.

Second Embodiment

Structure of Seal Member

Figure 18:
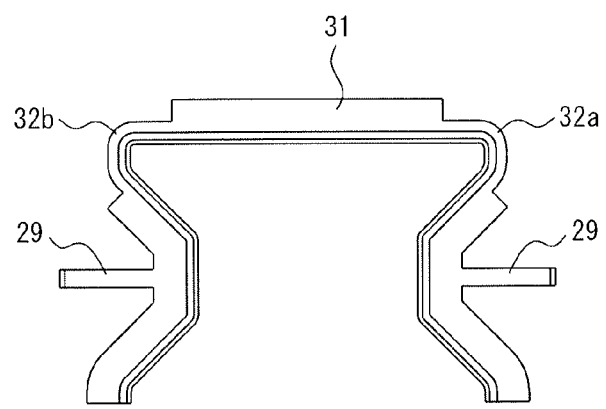
FIG. 18 is a front view of a seal member of another embodiment.
Figure 19:
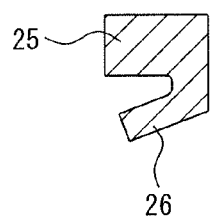
FIG. 19 is a cross-sectional view of a main section of the seal member of FIG. 18.

FIGS. 18 and 19 illustrate a modification of the seal member.

The structure of a seal member 31 of this embodiment differs from that of the seal member 17 shown in FIGS. 8 to 12 in that, as shown in FIG. 19, the cross-sectional forms of respective parts indicated by reference numerals 32a and 32b include the seal base 25 and the lip 26 but do not have the first extension section 27 and the first locking section 28.

According to the seal member 31 of this embodiment, such a structure not having the first extension section 27 or the first locking section 28 can make the lip 26 smaller. This is effective in the case where the surrounding space of the side seal 12 is limited.

Third Embodiment

Structure of Side Seal

Figure 20:
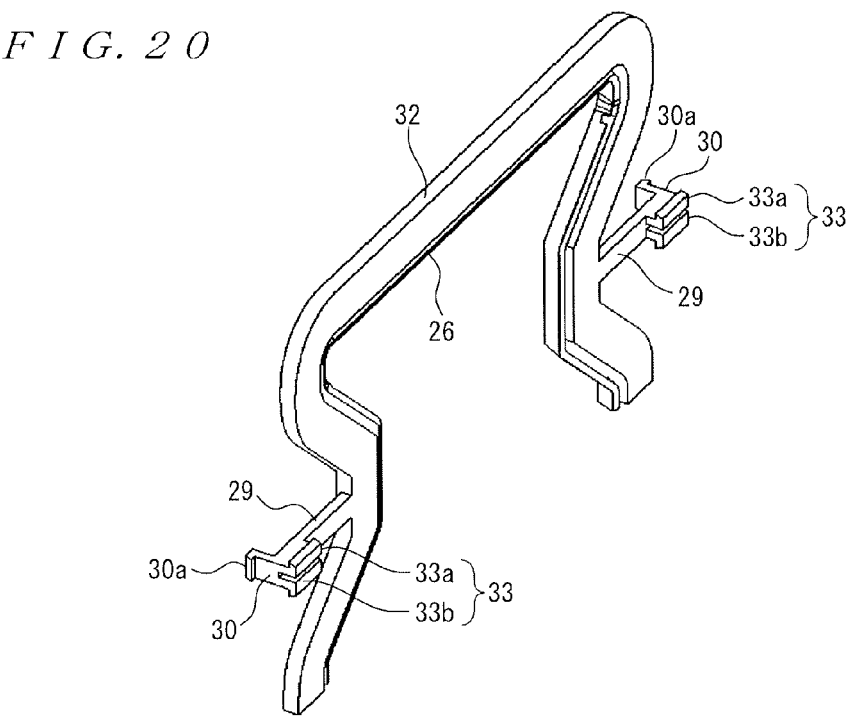
FIG. 20 is a front view of a seal member of yet another embodiment.
Figure 21:
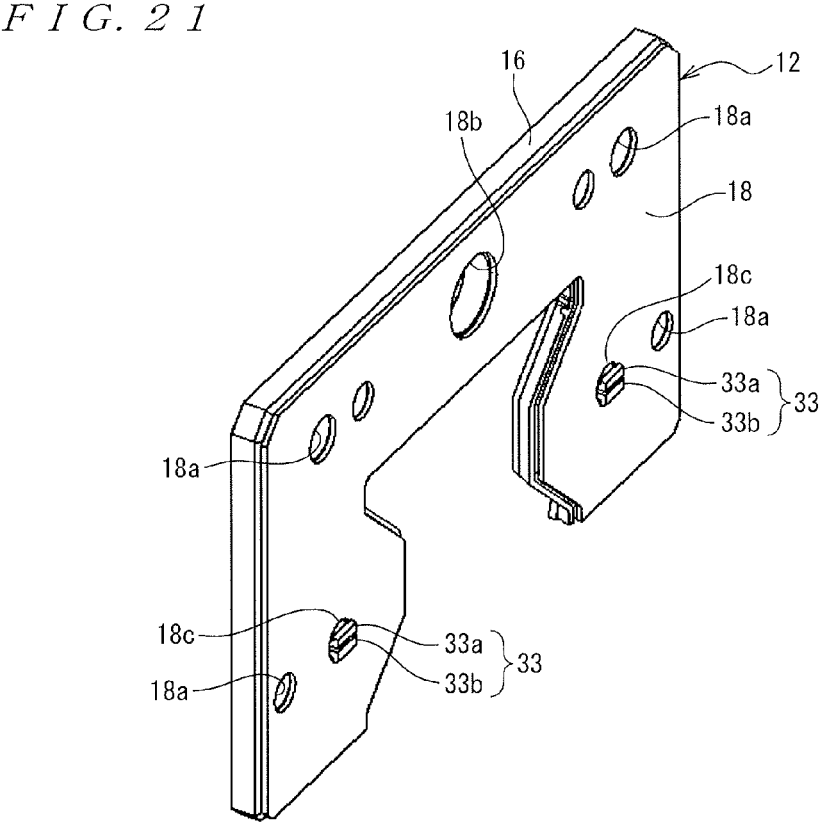
FIG. 21 is a view of a side seal comprising the seal member of FIG. 20.

FIGS. 20 and 21 show a structure of a side seal using this seal member and a modification thereof.

The structure of a seal member 32 of this embodiment differs from that of the seal member 17 shown in FIGS. 8A and 8B in that third locking sections 33 are formed in a position in the opposite direction to the protruding direction of the second locking section 30 formed in the end of the second extension section 29.

Each of these third locking sections 33 include a pair of elastic pieces 33a and 33b which can elastically deform in the direction of approaching toward each other.

The third locking sections 33 are engaged with the outer edges of respective engagement holes 18c formed in the cover member 18 by overlapping the retainer plate 16 and the cover member 18 via the seal member 32 therebetween, elastically deforming the pairs of elastic pieces 33a and 33b in the direction of approaching toward each other, and then elastically restoring them, as shown in FIG. 21. As a result, the seal member 32 is integrated with the cover member 18.

Moreover, the pairs of elastic pieces 33a and 33b included in the third locking sections 33 are oriented by 90 degrees from the orientation of the pawl parts 30a of the second locking sections 30. Therefore, when the elastic pieces 33a and 33b of the third locking sections 33 are deformed, the pawl parts 30a of the second locking sections 30 do not deform at all, accordingly. Consequently, when engaging the cover member 18 with the seal member 32, the seal member 17 does not separate from the retainer plate 16 at all.

According to this embodiment, the seal member 32 and the cover member 18 may be integrated by engagement of the third locking sections 33 with the engagement holes 18c, and the side seal 12 is integrated with the retainer plate 16, the seal member 32, and the cover member 18 before being secured to the end face of the end cap 10. Therefore, workability of attaching the side seal 12 to the end cap 10 may be improved. Note that while in this embodiment, the third locking sections 33 are formed in the seal member 32, the provision of a third locking section in the retainer plate 16 allowing engagement of the cover member 18 with the engagement hole 18c may provide the same result.

Fourth Embodiment

Structure of Retainer Plate

Figure 22:
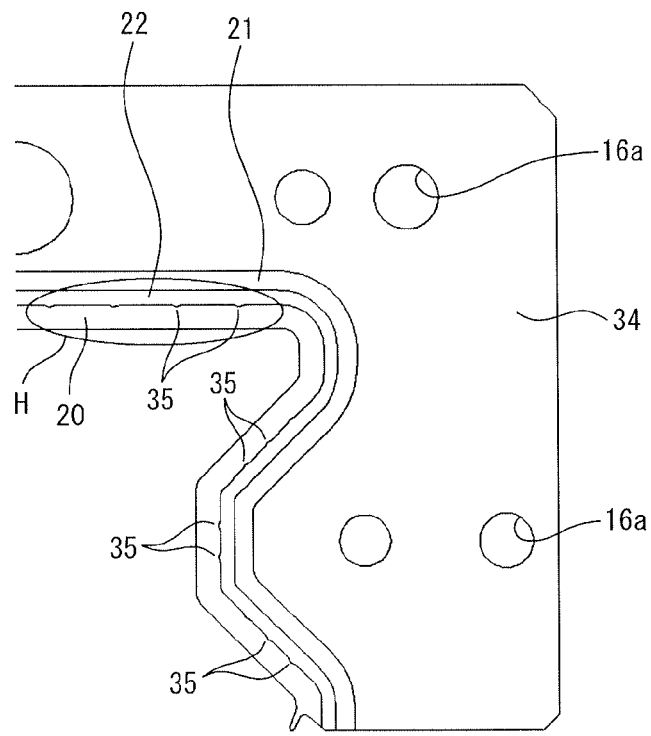
FIG. 22 is a front view of a main section of a retainer plate of another embodiment.
Figure 23:
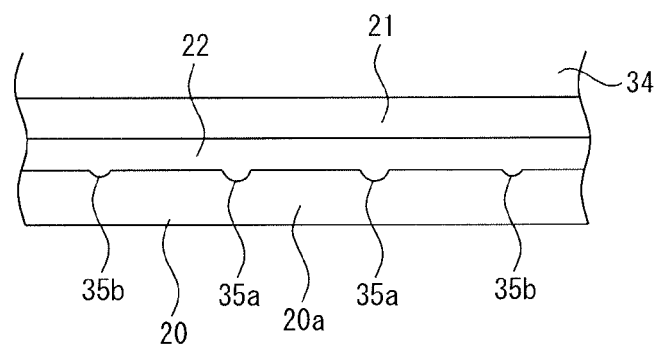
FIG. 23 is an enlarged view of the region indicated by a reference letter H of FIG. 22.

FIGS. 22 and 23 illustrate a modification of the retainer plate.

A retainer plate 34 of this embodiment does not have the cross-sectional direction alignment face 20b in the base accommodating section 20 of the retainer plate 16 shown in FIGS. 5 to 7. Instead, multiple projections 35 protruding toward the rail top surface 2a of the guide rail 2 and the pair of rail track surfaces 4 are arranged at predetermined intervals along the length thereof (in the extending direction of the band). Protruding quantity of each of those projections 35 is approximately 0.05 to 0.10 mm.

According to this embodiment, the lip 26 has contact with the rail top surface 2a of the guide rail 2 and the pair of rail track surfaces 4. When the seal base 25 is pushed down in the direction of detaching from the guide rail 2, the cross-sectional direction position alignment section 25b of the seal base 25 of the seal member 17 comes into contact with the multiple projections 35 formed along the length of the base accommodating section 20 at predetermined intervals. Therefore, the rail top surface 2a of the guide rail 2 and the pair of rail track surfaces 4 can be arranged at secured intervals from the lip 26.

In this case, for example, where the lip 26 facing the rail top surface 2a has been deformed due to a manufacturing error of the seal member 17, and the protruding quantity of the lip 26 in the central region in the widthwise direction of the rail top surface 2a has decreased, the deformed lip 26 facing the rail top surface 2a may be reformed by increasing the protruding quantity of a projection 35a in the central region and decreasing the protruding quantity of a projection 35b apart from the central region, as shown in FIG. 23.

Note that while the linear guide device 1 of the above-described embodiment is device with the rollers 7 used as rolling elements, it may be device with balls used as the rolling elements.

Moreover, while the linear guide device 1 of the above-described embodiment has the rail cover 9 on the rail top surface 2a, it is also applicable to device not having the rail cover 9 on the rail top surface 2a.

Fifth Embodiment

Structure of Side Seal

Figure 24:
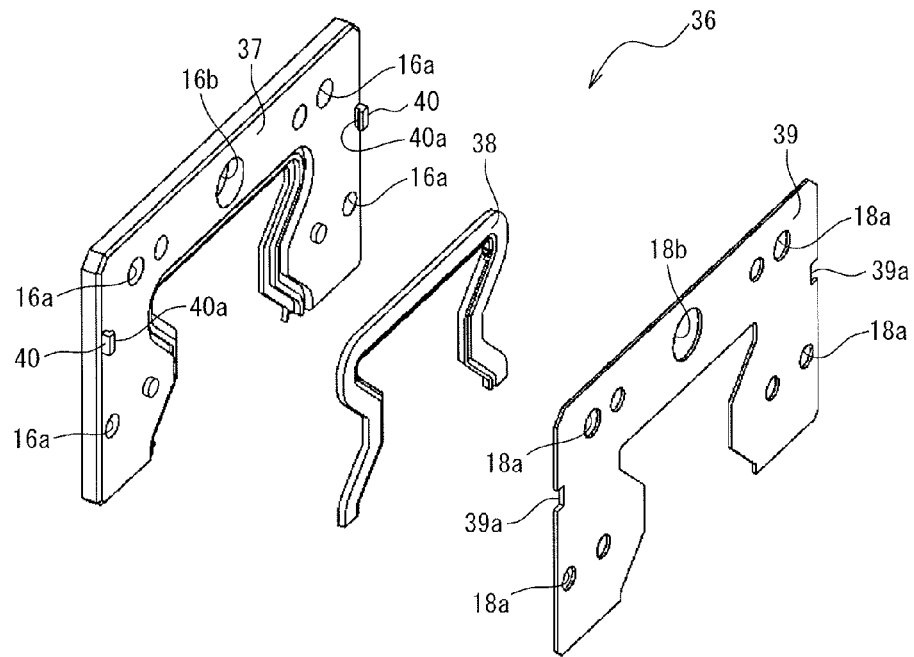
FIG. 24 is an illustration of constituent members of a side seal of another embodiment comprising the linear guide device.
Figure 25:
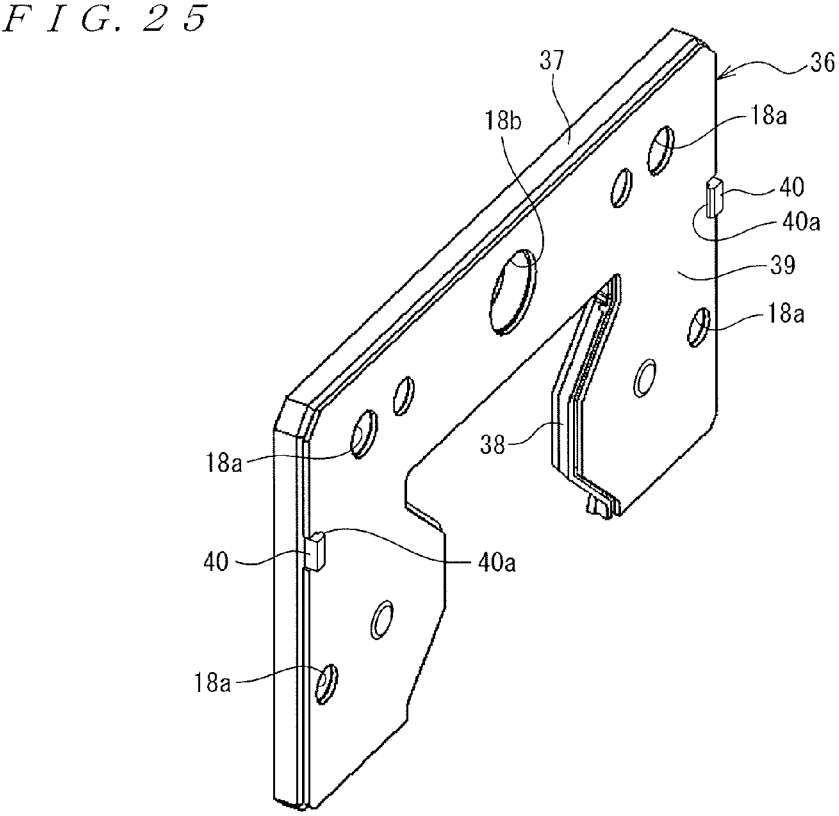
FIG. 25 is an illustration of an integrated form of the side seal of FIG. 24.

FIGS. 24 to 26 show a different side seal from the structure illustrated in FIG. 3. Note that identical reference numerals are given to respective identical component members to those of the side seal 12 shown in FIGS. 3 to 16, and description thereof is omitted.

A side seal 36 of this embodiment includes a retainer plate 37, a seal member 38, and a cover member 39 having an approximately identical shape to the retainer plate 37 (saddle-like and substantially U-shaped), as shown in FIG. 24.

The retainer plate 37 of this embodiment differs from the retainer plate 16 shown in FIG. 3 in that a pair of fourth locking sections 40 protruding in the direction of overlapping the cover member 39 on the outer peripheral region is formed. Pawl parts 40a are formed at the respective ends of the pair of fourth locking sections 40 in directions facing each other (see FIG. 26A).

The seal member 38 of this embodiment differs from the seal member 17 shown in FIGS. 8A and 8B in that the second extension section 29 (see FIGS. 8A and 8B) protruding outward from the approximately U-shaped, crooked portion is not formed.

Furthermore, the cover member 39 of this embodiment differs from the cover member 18 of FIG. 3 in that a pair of engagement concave sections 39a engaged with the pawl parts 40a of the pair of fourth locking sections 40 of the retainer plate 37 are formed (refer to FIG. 26A).

According to the side seal 36 of this embodiment, overlapping the retainer plate 37 and the cover member 39 via the seal member 38 are arranged therebetween, as shown in FIG. 25, and makes the pawl parts 40a formed in the ends of the pair of fourth locking sections 40 of the retainer plate 37 engage with the pair of engagement concave sections 39a of the cover member 39, integrating the retainer plate 37, the seal member 38 and the cover member 39.

As shown in FIG. 26B, the retainer plate 37 and the cover member 39 are integrated into a single body with a predetermined gap T1 left in the thickness direction between the pawl part 40a of each fourth locking section 40 and inner edge of corresponding engagement concave section 39a, and a predetermined gap T2 left in the cross-sectional direction between the inner wall of the engagement concave section 39a and the fourth locking section 40, that is, with backlash left in the thickness and the cross-sectional directions thereof.

According to this embodiment, since the seal member 38 constituting the side seal 36, the retainer plate 37, and the cover member 39 are integrated into a single body in a temporarily joined state where the pawl parts 40a of the retainer plate 37 are engaged with the engagement concave sections 39a of the cover member 39, an operation of attaching the side seal 36 to the end face of the end cap 10 is easily performed.

Moreover, the cover member 39 is integrated into the retainer plate 37 with backlash left in the thickness and the cross-sectional directions thereof. Even when the cover member 39 is somewhat warped, it may be normally integrated into the retainer plate 37. This allows reduction in the manufacturing cost of the cover member 39.

Moreover, since even such a warped cover member 39 does not deform the retainer plate 37, the seal member 38 may be normally attached, thereby preventing decrease in dust resistance and wear resistance.

Furthermore, the seal member 38 of this embodiment has a simple structure because the second extension section 29 (see FIGS. 8A and 8B) protruding outward from the approximately U-shaped, crooked portion is not formed, thereby allowing reduction in the manufacturing cost of the seal member 38.

INDUSTRIAL APPLICABILITY

As described above, the linear guide device according the present invention is useful for preventing decrease in dust resistance and wear resistance and preventing a seal member from falling off.

REFERENCE SIGNS LIST 1 linear guide device, 2 guide rail, 2a rail top surface, 3 rail installation hole, 4 rail raceway face, 5 slider, 5a attaching screw hole, 5b side wall, 6 slider raceway surface, 8 return passage, 9 rail cover, 10 end cap, 11 direction changing path, 12 side seal, 14 grease nipple, 15 step, 16 retainer plate, 16a and 18a tapped hole, 16b and 18b nipple insert hole, 16c one surface of the retainer plate, 16d other surface of the retainer plate, 16e inner periphery of the retainer plate, 17 seal member, 18 cover member, 18c engagement hole, 19 screw member, 20 base accommodating section, 20a thickness directional alignment face, 20b cross-sectional direction alignment face, 21 engaging groove, 22 land, 23 extension groove, 24 engaging hole, 24a engagement step section, 25 seal base, 25a thickness-directional position alignment section, 25b cross-sectional direction position alignment section, 25c cover member abutment section, 26 lip, 26a tip end of the lip, 26b lip protrusion, 27 first extension section, 28 first locking section, 29 second extension section, 30 second locking section, 30a pawl part, 31 and 32 seal member, 33 third locking section, 33a and 33b elastic piece, 34 retainer plate, 35 projection, 36 side seal, 37 retainer plate, 38 seal member, 39 cover member, 39a concave section, 40 fourth locking section, 40a pawl part T1 thickness of the seal base, and T2 depth of the thickness-directional alignment face of the retainer plate

The invention claimed is:

1. A linear guide device comprising: a guide rail, a slider mounted straddling the guide rail and moving relatively on the guide rail, and a side seal attached to an end face of the slider in a moving direction of the slider; wherein:
the side seal comprises a retainer plate having contact with the end face, a cover member overlapped with the retainer plate in a thickness direction of the retainer plate, and a seal member arranged between the retainer plate and the cover member,
the seal member is a member comprising a lip having contact with a guide face of the guide rail, a seal base, a first extension section smaller in thickness than the seal base, and a first locking section greater in thickness than the first extension section, which are all formed to be continuous from the guide face in a cross-sectional direction apart from the guide face,
the retainer plate comprises a base accommodating concave section that comprises a thickness directional alignment section and a cross-sectional direction alignment section and accommodates the seal base, and a first engagement concave section for accommodating the first locking section and controls a movement of the first locking section in the cross-sectional direction,
and when the lip slides on the guide face of the guide rail and the slider moves, the seal base comes into contact with the thickness directional alignment section and the cross-sectional direction alignment section of the base accommodating concave section and controls a movement in a thickness direction and the movement in the cross-sectional direction, and the first locking section is accommodated in the first engagement concave section, and
wherein the first locking section is separated by a gap from the first engagement concave section in both of the thickness and the cross-sectional directions.

2. The linear guide device according to claim 1, wherein:
a thickness-directional part of the seal base has contact with the thickness directional alignment section of the base accommodating concave section and the cover member, and having a relationship of T1>T2 where T1 denotes a thickness of the seal base and T2 denotes a depth of the base accommodating concave section to the thickness directional alignment section.

3. The linear guide device according to claim 1,
wherein the cross-sectional direction alignment section of the base accommodating concave section is a projection protruding toward the guide face, and
wherein, when the lip slides on the guide face of the guide rail and the slider moves, the projection controls the movement of the seal base in the cross-sectional directions.

4. The linear guide device according to claim 1, wherein:
the seal member comprises a second extension section smaller in thickness than the first locking section and a second locking section greater in thickness than the second extension section, both of which are formed orthogonal to the thickness direction apart from the guide face,
the retainer plate accommodates the second locking section and comprises a second engagement concave section for controlling a movement of the second locking section to the guide face in the cross-sectional direction, and
when the lip slides on the guide face of the guide rail and the slider then moves, the second locking section is accommodated in the second engagement concave section with gaps left in the thickness and cross-sectional directions.

5. The linear guide device according to claim 1, wherein the seal member and the retainer plate are respectively controlled in the thickness-directional movement by a first engagement section of the seal member and a second engagement section of the retainer plate, the second engagement section configured to engage with the first engagement section, and integrated into a single body attachable and detachable to each other.

6. The linear guide device according to claim 5, wherein the seal member and the cover member are respectively controlled in the thickness-directional movement by a third engagement section of the seal member and a fourth engagement section of the cover member, the fourth engagement section configured to engage with the third engagement section, and integrated into a single body attachable and detachable to each other.

7. The linear guide device according to claim 1, wherein the retainer plate and the cover member are respectively controlled in the thickness-directional movement by a first engagement section of the retainer plate and a second engagement section of the cover member, the second engagement section configured to engage with the first engagement section, and integrated into a single body attachable and detachable to each other.

* * * * *